United States Patent [19]

Schindl et al.

[11] Patent Number: 4,593,979

[45] Date of Patent: Jun. 10, 1986

[54] TILTING MICROSCOPE BINOCULAR BODY

[75] Inventors: Klaus P. Schindl, Vienna; Peter B. Puxkandl, Neugasse, both of Austria

[73] Assignee: C. Reichert Optische Werke AG, Vienna, Austria

[21] Appl. No.: 653,004

[22] Filed: Sep. 21, 1984

[30] Foreign Application Priority Data

Sep. 24, 1983 [DE] Fed. Rep. of Germany ....... 3334690

[51] Int. Cl.[4] ...................... G02B 21/20; G02B 23/04
[52] U.S. Cl. ...................................... 350/514; 350/555
[58] Field of Search .............................. 350/511–517, 350/522, 539, 550–558, 569, 571

[56] References Cited

U.S. PATENT DOCUMENTS

| | | | |
|---|---|---|---|
| 1,470,670 | 10/1923 | Heimstadt | 350/516 |
| 3,914,012 | 10/1975 | Boughton | 350/514 |
| 4,412,727 | 11/1983 | Taira | 350/514 |
| 4,436,384 | 3/1984 | Taira | 350/515 |

Primary Examiner—William H. Punter
Attorney, Agent, or Firm—Alan H. Spencer

[57] ABSTRACT

In a microscope possessing an adjustable-inclination binocular unit and an optical path system for erecting the image, these two subsystems possess a common splitting prism, thus shortening the overall optical path in the microscope, so that the space required for the optical components remains small. This is of particular importance in cases involving microscope objectives which are corrected to infinity.

4 Claims, 10 Drawing Figures

TILTING MICROSCOPE BINOCULAR BODY

BACKGROUND OF THE INVENTION

The invention relates to a microscope having an objective, a binocular unit and an optical path system for erecting the image, this optical path system comprising first and second optical components for deflecting the light beam and an optical bridge between the exit optical axis of the first optical component and the entry optical axis of the second optical component. The axes are parallel to one another and, starting from the normal initial positions of the components abut their respective axes, relative to the optical bridge, the angle of the first optical component about its exist optical axis is equal to the angle of the second optical component about its entry optical axis, but in the opposite sense to this angle, while in addition the entry optical axis of the first optical component coincides with the optical axis of the microscope objective.

A microscope of the foregoing type has, for example, been disclosed in German Offenlegungsschrift No. 2,502,209. In this microscope, the binocular unit can be pivoted in order to alter the viewing angle, to which end the optical components are rotatable about their respective axes. These optical components take the form of half-cube prisms and are aligned, in their normal initial positions, such that the entry optical axis of the first optical components is collinear with the exit optical axis of the second optical component, but counter to this axis, and the optical bridge is composed of a half-cube prism and a pentagonal prism of the roof-edge type, so that the image is rotated once through 180°. By this means, the observer does not see the observed object upside-down and the image is prevented from rotating when the binocular unit is pivoted, so that the orientation of the displacement of the image which is observed in the microscope is the same as the orientation of the manipulations performed on the object. As a result, it is comfortable to work with a microscope of this type.

The known microscope is of the stereoscopic type, in which each of the two stereo optical paths is provided with its own erecting path system, each of which is adjoined by an eyepiece tube. The intereyepiece distance is adjusted to match eye-spacing in the manner of a so-called bent tube, that it to say by swinging the two tubes about a central axis, together with their respective erecting path system and microscope objectives.

If it is desired to achieve image-erection in the case of a conventional microscope, which has not been designed for stereoscopic viewing, and which possesses a binocular unit which divides the single object beam between two optical paths, a problem of space arises. This space problem derives from the fact that the calculated image distance of the object or the focal length of the tube lens predetermines the distance of the plane of the intermediate image from the microscope objective or, when objectives which are corrected for infinity are used, the tube lens which follows the microscope objective. In reality, if the erecting system and the binocular unit are simply placed one behind the other, the latter splitting the optical path into two, the length of the optical path between the microscope objective and the eyepiece becomes so large that, in the case of a simple microscope which is not suitable for stereoscopic viewing but which possesses a binocular unit, the path length can no longer be accommodated.

OBJECT OF THE INVENTION

The object underlying the invention is to provide an improvement in this area, and to provide a conventional binocular microscope, with image-erection, in which this problem of space is solved.

SUMMARY OF THE INVENTION

This object is achieved, according to the invention, by adapting the second optical component of the erecting system to split the light beam and take the place of the optical divider provided in the binocular unit for non-stereoscopic viewing, and providing the binocular unit as a draw-tube, in which the distance between eyepieces can be altered by displacement along a straight line.

In this manner it is generally possible to obtain, in the first instance, a conventional binocular microscope with image-erection and an adjustable intereyepiece distance. The problem of space is solved, since the optical divider provided in the binocular unit, the entrance of which customarily points downwards, is replaced by the optical splitter forming part of the erecting system. Thus the light does not have to pass through two optical devices in succession, although the binocular unit now acquires a lateral entrance, in contrast is known binocular units. Furthermore, the two tubes of the binocular unit can be displaced along a straight line, thus preventing the image-rotation which occurs when the two tubes are pivoted about the single entry optical axis of the binocular unit.

The space requirement can be reduced still further if the optical erecting system is configured in the manner disclosed in German Patent Application No. 3,222,935 filed June 18, 1982 (U.S. Ser. No. 504,773 filed June 6, 1983 and now abandoned, such that, in the normal initial position, the entry optical axis of the first optical component on one side of the optical bridge is perpendicular to the optical axis of the bridge, and the exist optical axis of the second optical component on the opposite side of the optical bridge is likewise perpendicular to the optical axis of the bridge. In contrast to the optical bridge according to German Offenlegungsschrift No. 2,502,209, four reflections are not necessary in an optical erecting system of this type, but only two. It is possible to provide for these two reflections by employing, for example, only two half-cube prisms, in order to obtain an inversion of the image between the entry and exit points of the optical erecting system. Moreover, the optical components, invariably consist of prisms, for preference, although mirrors can also be considered.

In a further embodiment of the invention, the optical components of the erecting system are rotatable about their respective axes concurrently with an adjustment of the inclination of the binocular unit.

In the description which follows, the invention is explained in more detail by reference to the accompanying drawings.

DETAILED DESCRIPTION

Figure 1:
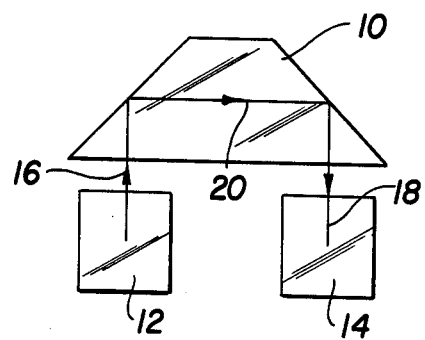
FIG. 1 shows a side view in the normal position of the optical path system for erecting the image, as used in a particular illustrative embodiment of the invention.

A trapezoidal prism 10 and two half-cube prisms 12 and 14 are depicted in FIG. 1. The exit optical axis 16 of the half-cube prism 12 runs parallel to the entry optical axis 18 of the half-cube prism 14. The half-cube prisms 12 and 14 can be rotated about the optical axes 16 and 18, and constitute the first and second optical components. It is also possible, in principle, for these components to take a different form. It is thus possible for a plurality of reflections to take place in the optical components, and the angle between the entry and exit optical axes can also assume values differing from 90°. It would also be possible to use mirrors in place of prisms. Similar considerations apply in the case of the optical bridge, which, in this particular case, is the trapezoidal prism 10. Here, too, more than two reflections could, in theory, occur, which could also be provided for with the aid of mirrors. Furthermore, it is not essential for the optical axis 20 of the optical bridge to be located perpendicularly to the exit optical axis of the first component 12 and perpendicularly to the entry optical axis 18 of the second component 14.

Figure 2:
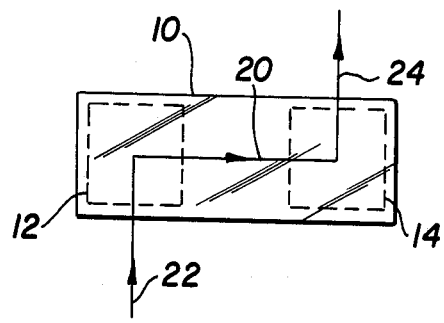
FIG. 2 shows a plan view of the optical path system, in the position shown in FIG. 1.

The normal position of this optical path system is particularly clearly evident from FIG. 2. From this Figure, it can readily be seen that the entry optical axis 22 of the first optical component 12, on one side of the optical bridge 10, in perpendicular to the optical axis 20 of the bridge 10, and the exit optical axis 24 of the second optical component 14, on the opposite side of the optical bridge, is likewise perpendicular to the optical axis of the bridge.

Figure 3:
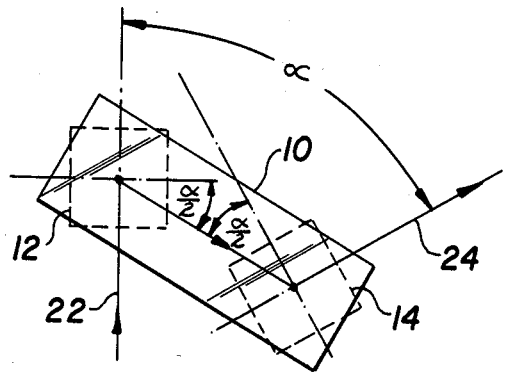
FIG. 3 shows a plan view of the optical path system, in a position which has been rotated out of the position shown in FIG. 1.

FIG. 3 illustrates a position differing from the normal position shown in FIGS. 1 and 2. From FIG. 3, it can be appreciated that, starting from the normal positions of the optical components 12 and 14 about their respective axes 16 and 18, as shown in FIGS. 1 and 2, the angle α/2 of the first optical component 12 about its exit optical axis 16 is equal to the angle α/2 of the second optical component 14 about its entry optical axis, but in the opposite sense to this angle. The overall result is then that a rotation, through an angle α, occurs between the entry axis 22 and the exit axis 24 of the optical path system.

Figure 4:
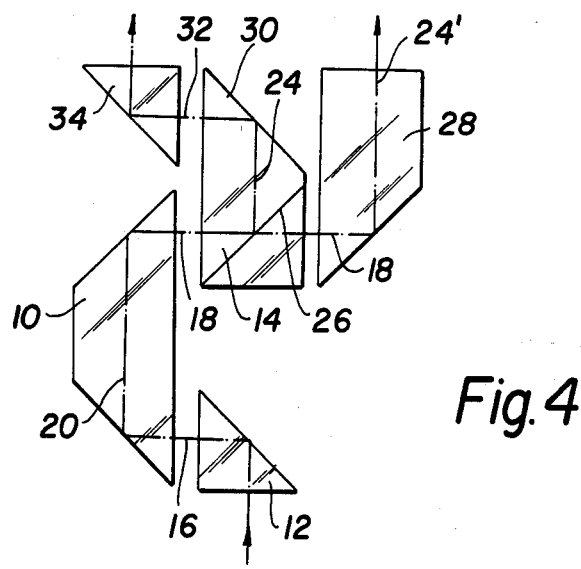
FIG. 4 shows, diagrammatically, a front view of the essential optical parts of the microscope according to the invention.

In FIG. 4, the optical path system which has just been described is shown in conjunction with the microscope according to the invention, the prism 14 now being a splitting prism which splits the beam emerging from the optical bridge 10 along the optical axis 18, splitting taking place at the surface 26. At the splitting surface 26, a portion of the beam is diverted along the optical axis 24, while the other potion of the beam passes along the optical axis 18, that is to say through the splitting surface, without being reflected at it. It is not reflected upwards until inside the prism 28 in that tube of the binocular unit which is shown on the right of FIG. 4, the beam, running along an axis 24' which is parallel to the optical axis 24. A half-cube prism 30 adjoins the splitting prism 14, with which it an be combined in a one-piece design. The prism 30 diverts the beam along the exit optical axis 24 towards the optical axis 32, this latter axis being at the same time the entry axis of a half-cube prism 34 which deflects the beam upwards, and which is assigned, in FIG. 4, to the left-hand tube of the binocular unit. In the upward direction, the prisms 28 and 34 are further followed by the eyepieces of the tubes, while the microscope objective would be positioned beneath the prism 12. The binocular unit is formed essentially by the prisms, 14, 28, 30 and 34, it being conspicuous that, in contrast to the prior art, this binocular unit has a lateral entry.

The splitting prism 14 preferably splits the beams in the ratio 50:50.

In contrast to a bent tube, in which the two tubes of the binocular unit (prisms 28 and 34) would have been capable of swinging about the optical axis 24 in order to be adjustable to suit the observer's eye-spacing, the present description relates to a so-called draw-tube, in which the two tubes (see prisms 28 and 34) can be shifted in the plane of the drawing in order to permit adjustment to suit the eye-spacing of the observer.

If the optical path system according to FIGS. 1 and 3 were to be combined with the binocular unit in the conventional manner, the beam which, in FIG. 4, points away from the splitting surface 26 towards the left, would point downward and would enter a further half-cube prism which would be the second optical component of the optical path system. Correspondingly, the optical bridge 10 and the first optical component 12 would also be located at a lower level, by a distance at least equal to the size of the additional half-cube prism.

Figure 5:
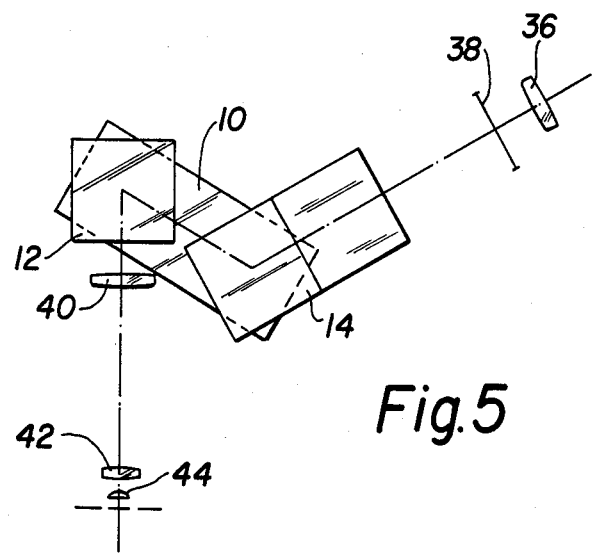
FIG. 5 shows, diagrammatically, a side view of the microscope shown in FIG. 4.

In the side view shown in FIG. 5 there is shown only one of the eyepieces, this eyepiece bearing the reference number 36, together with an intermediate image 38 is viewed by means of the eyepiece, and a tube lens 40 for correcting the microscope objective 42, by means of which the object 44 is viewed, to "infinity".

Figure 6:
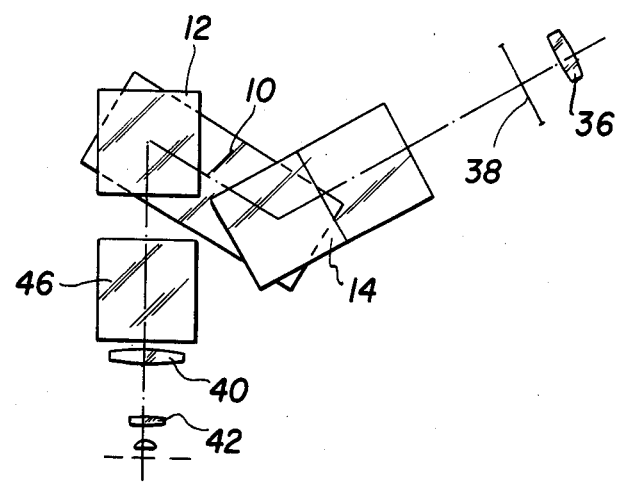
FIG. 6 shows, diagrammatically, a side view of a microscope according to the invention, which has been augmented by the addition of a single-reflection prism.

The space or, as the case may be, the optical length which is gained as a result of the above-mentioned omission of the half-cube prism can, insofar as the conditions allow, also be utilized for the installation of a single-reflection prism 46, as illustrated in FIG. 6.

Figure 7A:
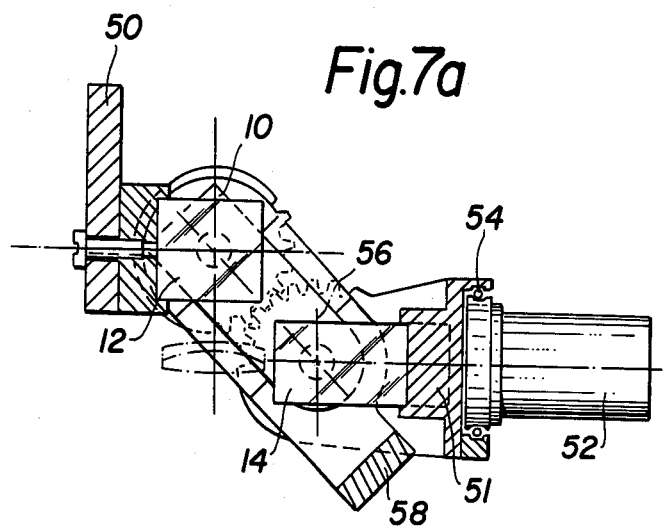
FIGS. 7a and 7b show vertical partial sections through the microscope according to the invention, in order to illustrate the mechanism, on the one hand with the binocular unit aligned horizontally, and on the other hand with the binocular unit aligned vertically.
Figure 8A:
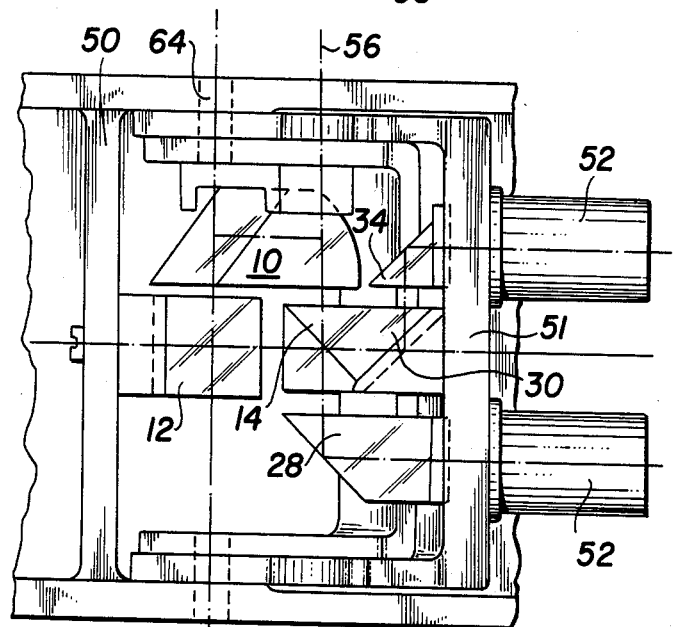
FIGS. 8a and 8b show a plan view which is related to FIG. 7a and a horizontal section which is related to FIG. 7b.
Figure 7B:
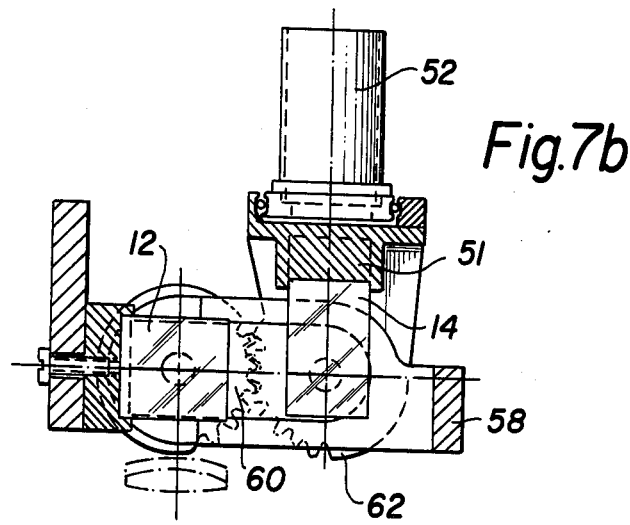
Figure 8B:
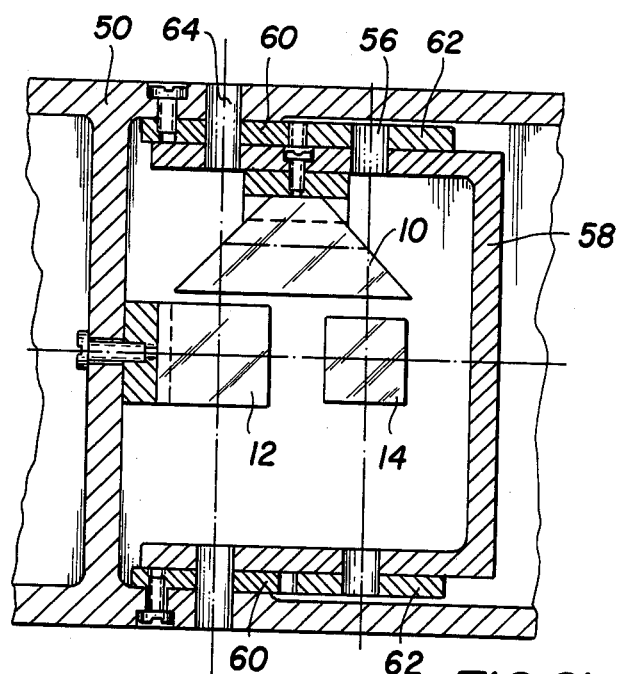

Reference is now made to FIGS. 7 to 8b. These FIGS. show vertical partial sections through the microscope in the two extreme positions, which, however, are never assumed under reasonable conditions, together with a plan view and a section in a horizontal plane. The first half-cube prism 12 of the optical path system is fastened to the microscope housing 50. The second half-cube prism, or splitting prism, 14, is connected to the tubes 52 of the binocular unit by means of a U-shaped holder 51. In order to adjust their separation to suit an observer's eye-spacing, the tubes 52 are movably mounted in bearings 54 (see FIG. 7a). The U-shaped holder 51 is mounted so that it is pivotable about an axis 56 which coincides with the optical axis 18. The trapezoidal prism forming the optical bridge 10 is fastened, as shown in particular by FIG. 8b, to a further U-shaped holder 58, which can be pivoted about the axis 64. A gearwheel 60 is located between the housing 50 and the holder 58, on each side of the latter. The gearwheel 60 is immovably installed on the housing, coaxial with the axis 64, and meshing, on each side, with a gearwheel 62 which is integrally formed on each open end of the limbs of the U-shaped holder 51. The gearwheel is fastened to the U-shaped holder 58 in a manner permitting rotation about the axis 56, the latter axis being coaxial with the optical axis 18. The holder 58 can therefore be swung about the shaft 64, which is immovably attached to the housing, whereupon the trapezoidal prism 10 is turned about the optical axis 16. The holder 51, carrying the tubes 52, is swung about the axis 56, which moves relative to the housing 50, but which is stationery with respect to the holder 58. During this movement the prism 14 is rotated on the optical axis 18. At the same time, the gearwheels ensure that the binocular unit tube 52 moves, relative to the optical bridge 10, through an angle which is double the angle through which the prisms 12 and 14 move, thus perfectly satisfying the requirement that rotation of the image should be prevented.

We claim:

1. In a microscope having a housing, an inclinable assembly with two eyepieces and an optical system for diverting light from a single vertical observation axis to a plurality of variably inclinable eyepiece axes, the improvement comprising;
   a first optical means (12) mounted in said housing to divert light from the observation axis (22) to a horizonal axis (16);
   an optical bridge (10) for receiving light on said horizonal axis and pivotably connected to said housing for rotation about said horizontal axis, said optical bridge having a bridge axis (20), the angle between the observation axis and bridge axis not exceeding 90°, said optical bridge exiting light along an exit axis (18), said exit axis being spaced from and parallel to said horizontal axis,
   a beam splitter (26) for separating light received along said exit axis into two portions, said beam splitter being pivotably connected to said optical bridge for rotation about said exit axis,
   first means (28) for diverting one of said two portions to one of the two eyepieces,
   second means (30, 34) for diverting the other of said two portions to the other of the two eyepieces, and
   means mechanically connecting said beam splitter, first means and second means to said housing to vary the angle of the light they divert as the optical bridge pivots,
   whereby the angle of the eyepieces, relative to the observation axis may be selectively varied to accomodate an individual user's preference.

2. The improvement of claim 1 wherein said first means and said second means are slidable mounted in a holder to provide a variable eyepiece spacing.

3. The improvement of claim 1 wherein said first optical means is a half-cube prism, said optical bridge is a trapezoidal prism.

4. The improvement of claim 1 wherein the verticle angle between the observation axis 22 and bridge axis 20 is equal and opposite to the verticle angle between the bridge axis 20 and axes 24, 24'.

* * * * *